United States Patent
Billings

(10) Patent No.: US 6,604,941 B2
(45) Date of Patent: Aug. 12, 2003

(54) REFRACTORY CRUCIBLES AND MOLDS FOR CONTAINING REACTIVE MOLTEN METALS AND SALTS

(76) Inventor: Garth W. Billings, 4627 Bridal Trail, Santa Rosa, CA (US) 95409

( * ) Notice: Subject to any disclaimer, the term of this patent is extended or adjusted under 35 U.S.C. 154(b) by 0 days.

(21) Appl. No.: 09/892,239

(22) Filed: Jun. 26, 2001

(65) Prior Publication Data

US 2001/0033950 A1 Oct. 25, 2001

Related U.S. Application Data

(63) Continuation-in-part of application No. 09/255,115, filed on Feb. 22, 1999, now abandoned, which is a continuation-in-part of application No. 08/823,350, filed on Mar. 24, 1997, now Pat. No. 5,934,900, which is a continuation-in-part of application No. 08/623,677, filed on Mar. 29, 1996, now abandoned.

(51) Int. Cl.$^7$ .............................. F27B 14/10; B32B 9/00
(52) U.S. Cl. ................. 432/265; 432/264; 428/332; 428/472; 428/698; 428/699; 428/701; 428/702
(58) Field of Search ................... 428/699, 698, 428/701, 702, 408, 472, 332; 432/264, 265, 285

(56) References Cited

U.S. PATENT DOCUMENTS

| | | | |
|---|---|---|---|
| 3,684,585 A | * | 8/1972 | Struop et al. |
| 3,771,976 A | * | 11/1973 | Wakefield |
| 3,890,140 A | * | 6/1975 | Ashbury |
| 4,284,687 A | * | 8/1981 | Dreyer et al. |
| 4,363,995 A | * | 12/1982 | Takigawa et al. |
| 4,768,757 A | * | 9/1988 | Nakamura et al. |
| 5,084,312 A | * | 1/1992 | Krikaorian et al. |
| 5,092,558 A | * | 3/1992 | Katsura |
| 5,213,848 A | * | 5/1993 | Zurecki et al. |
| 5,333,844 A | * | 8/1994 | Holcombe et al. |
| 5,427,843 A | * | 6/1995 | Miyajima et al. |
| 5,443,111 A | * | 8/1995 | Colvin et al. |
| 5,447,803 A | * | 9/1995 | Nagaoka et al. |

* cited by examiner

Primary Examiner—Archene Turner
(74) Attorney, Agent, or Firm—Henry P. Sartorio

(57) ABSTRACT

Refractory ceramics and composite materials consisting of nitrides, mixed nitrides and oxides, and oxynitrides of Group IV metals Hf, Zr, Ti, and Group III metals Sc, Y, and lanthanides La through Lu, are used to form refractory articles, or as coatings for refractory articles. These materials and articles have high resistance to molten metals, molten salts, erosion, and high temperature corrosive environments, and can be engineered to have desirable thermal and electrical properties. In particular the articles are crucibles, molds, containment vessels, and spray nozzles, and most particularly these articles are made of or coated with the Hf compounds.

20 Claims, 2 Drawing Sheets

REFRACTORY CRUCIBLES AND MOLDS FOR CONTAINING REACTIVE MOLTEN METALS AND SALTS

RELATED APPLICATIONS

This application is a continuation-in-part (CIP) of Ser. No. 09/255,115 filed Feb. 22, 1999 Now Abandoned which is a continuation-in-part (CIP) of Ser. No. 08/823,350 filed Mar. 24, 1997, now U.S. Pat. No. 5,934,900, which is a continuation-in-part (CIP) of Ser. No. 08/623,677 filed Mar. 29, 1996, now abandoned, all of which are herein incorporated by reference.

BACKGROUND OF THE INVENTION

1. Field of the Invention

The present invention relates generally to refractory materials and articles, and their methods of manufacture, and more particularly to refractory materials and articles with high resistance to molten metals, molten salts, and high temperature corrosive environments.

2. Description of Related Art

In many fields there is a need for highly refractory, chemically resistant, and thermodynamically stable materials and articles. Materials and articles with high melting points and with good mechanical and electrical properties are needed for use in thermochemical processing technologies incorporating materials in the form of molten metals, molten salts, reactive gases, and other corrosive chemicals. One particularly important area of application is crucibles, molds, and other containment vessels. Another important area is processing tools like stirring rods, transport tubes, temperature probes, bricks and mortar, and coated structures.

Materials and articles are required which can withstand high operating temperatures and can be exposed to a variety of difficult to handle materials, ranging from reactive metals like Ti, NiTi, Ti alloys, nickel and cobalt based super alloys and stainless steels, Zr, Hf, V, Nb, Ta, and Be, to lanthanide metals La to Lu, to actinide metals like U and Pu, as well as commonly used aggressive salts like alkali-halides (e.g., NaCl, KCl, LiCl) and alkaline earth-halides (e.g., $CaCl_2$, $CaF_2$). In addition, refractory materials and articles must withstand thermal cycling conditions, i.e., heating and cooling, without spalling or cracking; and must be able to be tailored to be good thermal and electrical conductors or thermal and electrical insulators.

Some of the problems associated with thermochemical processes are the result of high temperatures and very chemically reactive materials used for specific functions in the processes. Molten salts and metals are extremely aggressive at high temperatures and attack the molds or crucibles used to contain them in the processing vessel.

Metals like tungsten and tantalum have been used for crucibles, but the molten salts gradually erode them and molten metals can form alloys or intermetallic compounds with them. When the metals are corroded or no longer useable, they are discarded as waste. Magnesia (MgO), calcia, (CaO), tetragonally stabilized zirconia ($ZrO_2$), and yttria ($Y_2O_3$) are examples of ceramic materials that have been used for crucibles, but these materials are either wetted or attacked by the melts, or crack easily from thermal shock, or from stresses that build up at the interface between the melt and crucible, so they get limited use and are then discarded as waste.

Some coating technologies have yielded promising results, although the materials and articles produced by these methods have inherent problems as well. Important examples of inherent problems are those associated with protective coatings that are either dip-coated or plasma sprayed on crucibles and molds. These coatings may have different thermal and chemical properties than their host; thus, property mismatches cause spalling or cracking of the protective coating, causing contamination of the melt, and allowing the host material to be exposed to the environment and attacked.

In the past, contractors to the US Department of Energy have utilized crucibles and molds containing beryllia (BeO), zirconia ($ZrO_2$), and yttria ($Y_2O_3$) for containing reactive metals like beryllium and uranium. These materials crack, spall, or react into the melts, causing premature failure of the refractory and add impurities to the final cast-metal products. Other technologies widely employed for processing reactive metals are arc-melting, electron-beam melting, and cold-wall induction melting. Under these conditions, the reactive molten metals are frozen, or solidified, quickly at the surface of the containment vessel, and thus are not allowed time to react with the container. However, these processes require large capital investments, are complicated, and have high operating costs. Further, an inherent problem with these technologies is that they do not allow for thorough mixing (or alloying) which may be desired or required for the final properties of the products.

U.S. Pat. No. 5,084,312 to Krikorian et al describes molten metal containment vessels with rare earth or rare earth like sulfide and oxysulfide coatings which inhibit wetting. Also described therein are conventional materials for containment vessels, including graphite, refractory metals, oxides, and fluorides. U.S. Pat. No. 4,363,995 to Crawford et al describes metal oxide or metal sulfide coatings. U.S. Pat. No. 4,876,725 to Furukawa et al describes high density sintered articles of silicon carbide. U.S. Pat. No. 3,890,140 to Asbury describes an aluminum titanate crucible for molten uranium. U.S. Pat. No. 5,934,900 to Billings describes numerous ceramic materials and ceramic-metal articles for containing a variety of molten materials and this application relates to and expands on some of those materials and articles.

SUMMARY OF THE INVENTION

Accordingly, it is an object of the invention to provide improved refractory materials and articles with high resistance to molten metals, molten salts, and high temperature corrosive environments, and materials that can be tailored to have desirable thermal and electrical properties for specific process requirements.

The invention is a class of refractory ceramic and composite materials that are used to form refractory articles, or as coatings for refractory articles, comprising nitrides, mixed nitrides and oxides, and oxynitrides of Group IV metals selected from Hf, Zr, and Ti; and nitrides, mixed nitrides and oxides, and oxynitrides of Group III metals selected from Sc, Y, and the lanthanides La through Lu, alone or combined or reacted with the above Group IV (Hf, Zr, Ti) refractory materials. Thus the refractory materials of the invention encompass nitrides, nitride/oxide mixtures, and oxynitrides of the Group IV (Hf, Zr, Ti) metals, and Group III (Sc, Y, and the lanthanides La through Lu) metals, and mixtures and composites thereof. The invention encompasses both stoichiometric and sub-stoichiometric materials. Further, the invention includes the refractory articles formed of, or coated with, these refractory materials.

In particular the invention is directed to articles comprising containment vessels, particularly crucibles and molds, and also spray nozzles. Also in particular the invention is directed to articles made of the nitrides of hafnium (Hf), including pure nitrides, mixed nitrides and oxides, and oxynitrides. The Hf nitride materials may also be combined with or reacted with the nitrides of the Group III metals (Sc, Y, and the lanthanides La through Lu), including pure nitrides, mixed nitrides and oxides, and oxynitrides. The articles may be made entirely of these materials, or these materials may form an external coating on an internal body formed of metal, ceramic, or graphite.

DETAILED DESCRIPTION OF THE INVENTION

Figure 1:
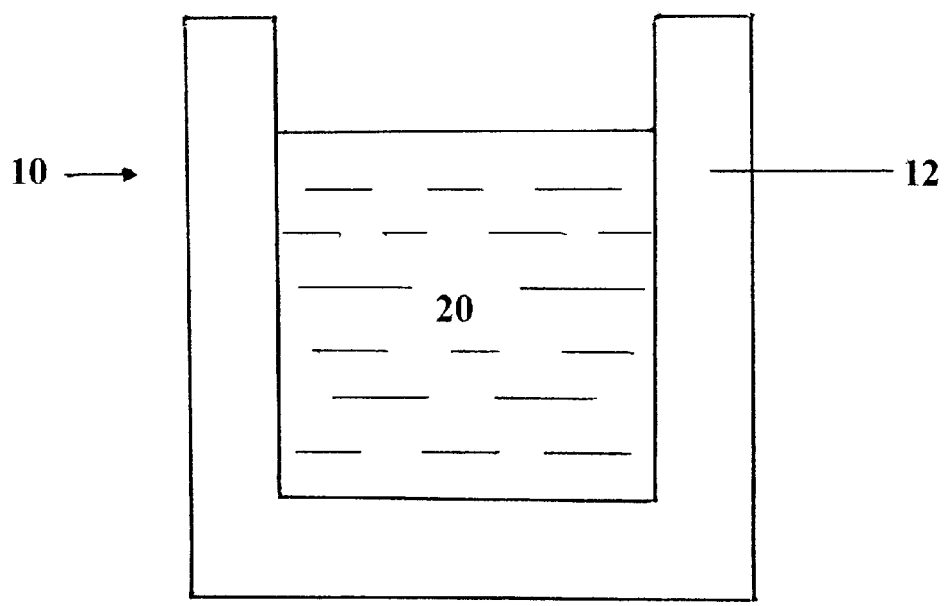
FIG. 1 is a sectional view of a crucible, mold, or containment vessel made entirely of the refractory materials.

According to the invention, these refractory ceramic and composite materials can be engineered and produced to provide a high degree of resistance to molten metals, molten salts, corrosive environments, and modified for desirable thermal, electrical, and other properties. The refractory materials of the invention comprise: 1) Group IV metal (M=Hf, Zr, and Ti) nitrides ($M_xN_y$), mixtures of Group IV metal nitrides and Group IV metal oxides ($M_xN_y:M_xO_z$), and Group IV metal oxynitrides ($M_xN_yO_z$). 2) Group III metal (M'=Sc, Y, and lanthanides La through Lu) nitrides ($M'_xN_y$), mixtures of Group III metal nitrides and Group III metal oxides ($M'_xN_y:M'_xO_z$), and Group III metal oxynitrides ($M'_xN_yO_z$). 3) The Group III metal refractory materials of (2 above) can be combined or reacted with the above Group IV refractory materials of (1 above) to form composites with binary, ternary, quaternary, solid-solution, or multiple compound phases and stoichiometries. All of these refractory materials are encompassed by the general formula $M_{x1}M'_{x2}N_yO_z$ where each of x1, x2, y, z$\geq$0 but x1+x2$\neq$0 and y+z$\neq$0, and y$\neq$0 if z$\neq$0.

More specifically, the refractory materials include metal Hf nitrides having a general formula $Hf_xN_y$ where N is nitrogen. Metal nitrides having at least 50 atomic percent metal and no more than 50 atomic percent nitrogen, are preferred. Illustrative materials include $Hf_3N_2$, $Hf_4N_3$, $HfN_{1-y}$, and HfN. The refractory materials also include mixtures of Hf nitrides plus Hf oxides with a general formula $Hf_xN_y:HfO_z$ where N is nitrogen, and O is oxygen. Illustrative composite materials range from 15%$Hf_xN_y$+ 85%$HfO_2$ to 85%$Hf_xN_y$+15%$HfO_2$. The refractory materials also include Hf oxynitrides or cubic solid-solution oxide:nitride materials with a general formula $Hf_xN_yO_z$.

More specifically, the refractory materials also include Group III metal nitrides having the general formula $M'_xN_y$ where M' is Sc, Y, or the lanthanides La through Lu, and N is nitrogen. Illustrative materials include ScN, YN, LaN, CeN, DyN, TbN, HoN, and ErN. The refractory materials also include mixtures of Group III metal nitrides plus Group III metal oxides with a general formula $M'_xN_y:M'_xO_z$ where M' is Sc, Y, or the lanthanides La through Lu, N is nitrogen, and O is oxygen. Illustrative composite materials range from 25%$Y_2O_3$+75%YN to 75%$Y_2O_3$+25%YN. The refractory materials also include Group III metal oxynitrides with a general formula $M'_xN_yO_z$ where M' is Sc, Y, or the lanthanides La through Lu. Illustrative materials range from $La_2N_1O_2$ to $La_2N_{0.50}O_{2.50}$.

More specifically, the refractory materials also include the above Hf refractory materials reacted with the above Group III refractory materials to form solid-solutions, ternary ceramic materials, or quaternary ceramic materials, e.g., HfN:YN, HfN:$Hf_2La_2O_7$, 75$Hf_7Sc_2O_{17}$:25HfN, and composites consisting of mixtures of the Hf refractory materials, and Group III refractory materials, e.g., HfN:$HfO_2$:M'N:$M'_2O_3$. These materials would be selected based upon the requirements of the application and mixed according to the properties provided by the compound constituents, i.e., corrosion resistance, thermal conductivity or resistivity, or electrical conductivity or resistivity.

These refractory materials can be made by a variety of different techniques, including but not limited to high temperature vacuum processing, powder reaction and metallic reduction processing, liquid-phase sintering processing, reactive gas processing, and conventional sintering.

Using vacuum processing technology, pure nitride materials having normal stoichiometry, are heated in high vacuum to remove nitrogen from the compound to produce a metal rich nitride stoichiometry. Using powder reaction technology, pure nitride powder and pure metal powder are mixed and heated to react and produce a metal rich nitride product; or pure oxide powders are mixed with small amounts of carbon powder, formed into an article and sintered to react and density a sub-stoichiometric compound material; or oxide and nitride compound powders are mixed together, pressed into a form, and heated to their reaction temperature to form ternary compounds and composite materials. Using metallic reduction technology, pure ceramic and pure metal are heated in controlled atmospheres to reduce the ceramic to metal rich phases. Similarly, metals can be treated by reactive gas processes in a high temperature furnace or by combustion synthesis, in a nitrogen, or a nitrogen plus oxygen atmosphere, to produce nitrides or oxynitrides. The ceramics and composites can also be made by high temperature sintering of the mixed and pressed powders.

These materials in the powder form can be slip cast, extruded, or isopressed to form articles, followed by high temperature sintering to densify the articles. The powder materials can also be used to form a paint which can be applied by hand-brushing or by spraying on other articles, or by dipping articles into a slurry of the paint and then sintering to form a protective coating. A paint can be made by combining these refractory ceramic powders in a slurry with a carrier and binder agent, e.g. butyl acetate liquid with about 1 to 3 weight percent nitrocellulose binder, or other liquid carriers with cellulosic binders. The paint is then applied to objects or articles, the liquids and binder agents are removed (evaporated or decomposed) by slow heating to about 500° C. in a low pressure vacuum, and then the coating is high temperature sintered into place at temperatures typically above 1800° C.

Other procedures to apply these materials as protective coatings can be utilized such as pack cementation, plasma spraying techniques, physical vapor deposition techniques, or chemical vapor deposition techniques.

Some examples of methods for producing these articles:

1. Spray forming refractory materials over a formed body, followed by powder sintering and reaction processing technology:

Tantalum coated with hafnium nitride (Ta—Hf$_x$N$_y$):

Pure HfN powder is mixed with Hf metal powder (in the gram molecular weight proportions of 2HfN+1Hf). Then, a paint is made by adding a carrier liquid (e.g. butyl acetate) with a binder material (e.g. 3 weight percent nitrocellulose) to the ceramic (2HfN) plus metal (1Hf) powder mixture, and blended thoroughly. A tantalum metal part (e.g. Ta crucible) is then spray painted with the paint mixture above to apply a layer of the paint material with the desired thickness (e.g. 0.001" to 0.125"). The part is allowed time to dry, then the part is loaded into a vacuum and controlled atmosphere furnace. The system is then evacuated to a low pressure (e.g. $\leq 10^{-1}$ torr), and slowly heated (e.g. ~2° C./min. to ~400° C.) until the binder material has been removed. The system is then backfilled with argon up to ambient pressure, and heating is continued at a fairly rapid rate (e.g. 50° C./min), where at ~2000° C. interfacial bonding between the tantalum and the hafnium metal powder begins, continuing past 2250° C. where the hafnium metal powder in the paint mixture begins melting and causing liquid-phase sintering of the hafnium nitride ceramic powder to occur, up to a temperature of at least 2300° C. where the Hf+2HfN are sintering to density and reacting to form Hf$_x$N$_y$ (e.g. Hf$_3$N$_2$). The temperature of at least 2300° C. is held for a period of time of at least 15 minutes to over 1 hour. Then, the system is cooled down to a temperature of ~1400–1500° C., when the argon gas flow is stopped and nitrogen gas (N$_2$) is introduced at a modest flow rate. The temperature of ~1400–1500° C., with N$_2$ flowing, is held for a period of time long enough to convert residual Hf metal and/or Hf$_3$N$_2$ to the desired HfN$_{1-y}$ phase, typically on the order of 2 to 4 hours. At the end of the 1400–1500° C. in N$_2$ hold period, the system atmosphere is evacuated and backfilled with argon, and then cooled to ambient conditions. The resulting part is a tantalum crucible with a well-bonded hafnium nitride ceramic coating (Ta—HfN).

2. Plasma spraying technology can be applied for producing the refractory articles of this invention. Graphite can be plasma sprayed with a 0.001–0.010" thick coating of molybdenum or alloy, to serve as a diffusion barrier, followed by plasma spraying an outer coating of the refractory materials described herein.

The materials of the invention have applications for metallurgical and thermochemical processing technologies including extraction, refining, and casting of reactive metals, and waste treatment technologies. These materials can be engineered and modified to have specific properties for particular applications. In particular, these materials can be used in applications that require resistance to molten metals (where the hafnium nitride Hf$_x$N$_y$ material, ternary oxide materials Hf$_x$Y$_y$O$_z$, and nitride:oxide materials Hf$_w$Y$_x$O$_y$N$_z$ have been demonstrated to be highly resistant to molten Ti, Zr, and stainless-steel alloys, actinide metals U and Pu, lanthanide metals, Group V metals V and Nb, Group VI metals Cr and Mo; Group II metals, particularly Be, and ferrous metals). These materials can also be used in applications that require resistance to molten salts, particularly Group I halides, Group II halides, actinide halides, and lanthanide halides. These materials can also be used in applications that require erosion resistance and resistance to high temperature corrosive environments. These materials can also be used for susceptors in an induction field.

Preferred applications are refractory articles, including crucibles, molds, containment vessels, molten metal spray nozzles, bricks, and mortar. These articles can be made entirely of the disclosed nitride, nitride:oxide, or oxynitride ceramics or composites, or these materials may be applied as protective coatings on other host materials. These articles, made of or coated with the above described refractory materials, form a part of the invention.

Figure 2:
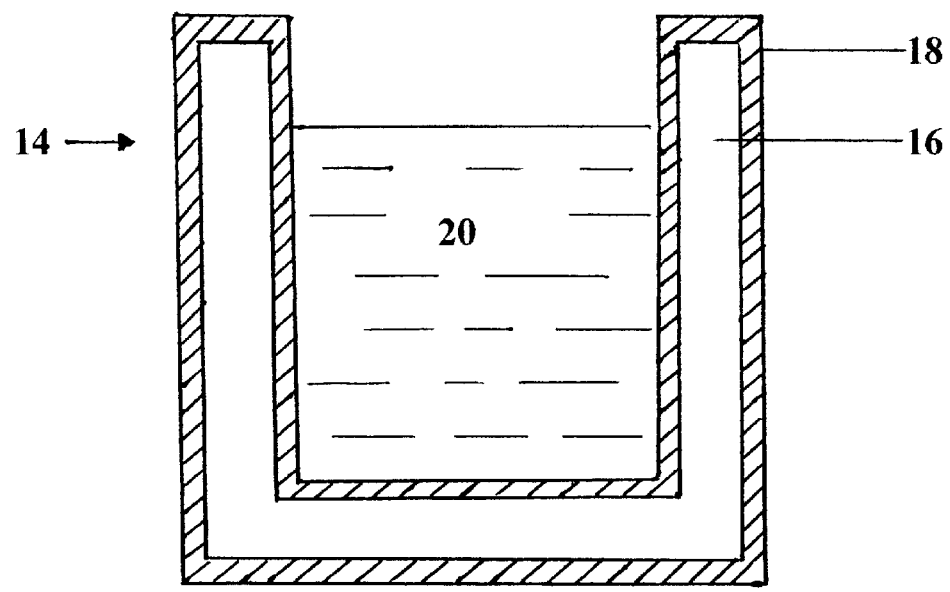
FIG. 2 is a sectional view of an alternate crucible, mold, or containment vessel having an external surface of the refractory materials.
Figure 3:
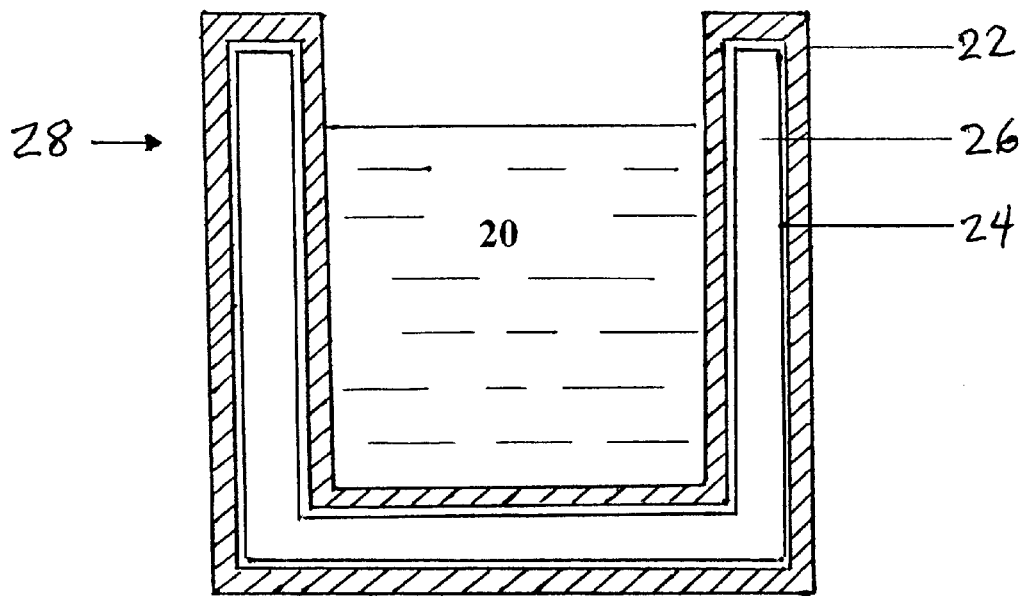
FIG. 3 is a sectional view of an alternate crucible, mold, or containment vessel having an external surface of the refractory materials, with an intermediate layer of a functional material, such as a diffusion barrier or thermal expansion modification material.

A crucible, mold, or containment vessel according to the invention is shown in FIG. 1. The crucible, mold, or containment vessel 10 is formed of a shaped body 12 which is shown with a molten metal or molten salt 20 contained therein. The crucible, mold, or containment vessel of FIG. 1 is formed entirely of the refractory nitrides, mixed nitrides and oxides, or oxynitrides. An alternate crucible, mold, or containment vessel 14 shown in FIG. 2 has an external surface or coating 18 of the refractory nitrides, mixed nitrides and oxides, or oxynitrides, and an internal body 16 of other materials (e.g. Ta, W, Nb, Mo, alloys thereof, or ceramics, or graphite). An alternate crucible, mold, or containment vessel shown in FIG. 3 has an external surface or coating 22 of the refractory metal nitrides, oxides, mixed nitrides and oxides, or oxynitrides, an intermediate functional layer 24 of other materials (e.g. Hf, Mo, Ta, W, Re, alloys thereof, or ceramics and cermets), and an internal body 26 of other materials (e.g. Ta, W, Nb, Mo, alloys thereof, or ceramics, cermets, or graphite). The intermediate functional layer 24 may function as a diffusion barrier or thermal expansion modification material.

Other refractory articles, according to the invention, can also be formed of a shaped body or substrate made of the refractory material or made of another host material and coated with the refractory material. Thus the invention includes all refractory articles having at least a surface thereof formed of the disclosed refractory materials.

However, the invention is more specifically directed to particular types of articles made of the above described materials. These articles include crucibles, molds and other containment vessels for containing molten metals and salts as described above, and also include molten metal spray nozzles. Most particularly the invention is directed to these articles made of Hf nitrides, Hf nitride/oxide mixtures, and Hf oxynitrides, and these Hf compounds combined with or reacted with similar group III (Sc, Y, lanthanides La through Lu) compounds.

Changes and modifications in the specifically described embodiments can be carried out without departing from the scope of the invention which is intended to be limited only in scope of the appended claims.

What is claimed is:

1. An article of manufacture comprising a molten metal processing or molten salt processing article selected from a refractory crucible, mold, containment vessel, or molten metal spray nozzle, wherein the article further comprises a shaped body having at least a molten metal contacting and resistant or molten salt contacting and resistant layer formed of a refractory material selected from a nitride, mixed nitride and oxide, or oxynitride of a Group IV metal selected from Hf and Zr; a nitride, mixed nitride and oxide, or oxynitride of a Group III metal selected from Sc, Y, and the lanthanides La through Lu; and combinations or reaction products of a nitride, mixed nitride and oxide, or oxynitride of a Group IV metal selected from Hf, Zr, and Ti, and a nitride, mixed nitride and oxide, or oxynitride of a Group III metal selected from Sc, Y, and the lanthanides La through Lu.

2. The article of claim 1 wherein the entire shaped body is formed of the refractory material.

3. The article of claim 1 wherein the shaped body comprises:
   a central portion formed of a metal, ceramic, or graphite;
   an outer coating on the central portion and formed of the refractory material.

4. The article of claim 3 wherein the central portion is formed of metal selected from Ta, W, Nb, Mo, or alloys of these metals.

5. The article of claim 3 further comprising an intermediate functional layer between the central portion and the outer coating.

6. The article of claim 1 wherein the Group IV metal is Hf.

7. The article of claim 1 wherein the refractory material is selected from a nitride, mixed nitride and oxide, or oxynitride of a Group IV metal selected from Hf and Zr, and has a thickness of at least about 25 micrometers.

8. The article of claim 1 wherein the refractory material is selected from a nitride, mixed nitride and oxide, or oxynitride of a Group III metal selected from Sc, Y, and the lanthanides La through Lu.

9. The article of claim 1 wherein the refractory material is selected from a Group III–Group IV combination or reaction product of a nitride, mixed nitride and oxide, or oxynitride of a Group IV metal selected from Hf, Zr, and Ti, and a nitride, mixed nitride and oxide, or oxynitride of a Group III metal selected from Sc, Y, and the lanthanides La through Lu.

10. An article of manufacture comprising a molten metal processing or molten salt processing article selected from a refractory crucible, mold, containment vessel, or molten metal spray nozzle, wherein the article further comprises a shaped body having at least a molten metal contacting and resistant or molten salt contacting and resistant layer formed of a hafnium nitride, the hafnium nitride having a thickness of at least about 25 micrometers.

11. The article of claim 10 wherein the entire shaped body is formed of the hafnium nitride.

12. The article of claim 10 wherein the shaped body comprises:

a central portion formed of a metal, ceramic, or graphite;

an outer coating on the central portion and formed of the hafnium nitride.

13. The article of claim 12 wherein the central portion is formed of metal selected from Ta, W, Nb, Mo, or alloys of these metals.

14. The article of claim 12 further comprising an intermediate functional layer between the central portion and the outer coating.

15. The article of claim 10 wherein the hafnium nitride is mixed with hafnium oxide.

16. The article of claim 10 wherein the hafnium nitride is a hafnium oxynitride.

17. The article of claim 10 wherein the hafnium nitride is combined with or reacted with a nitride, mixed nitride and oxide, or oxynitride of a Group III metal selected from Sc, Y, and the lanthanides La through Lu.

18. The article of claim 12 comprising a tantalum crucible with a hafnium nitride coating.

19. An article of manufacture comprising a molten metal processing or molten salt processing article selected from a refractory crucible, mold, containment vessel, or molten metal spray nozzle, wherein the article further comprises a shaped body having at least a molten metal contacting and resistant or molten salt contacting and resistant layer formed of a refractory material selected from a nitride, mixed nitride and oxide, or oxynitride of a Group IV metal selected from Hf, Zr, and Ti, having a thickness of at least about 25 micrometers; and combinations or reaction products of a nitride, mixed nitride and oxide, or oxynitride of a Group IV metal selected from Hf, Zr, and Ti, and a nitride, mixed nitride and oxide, or oxynitride of a Group III metal selected from Sc, Y, and the lanthanides La through Lu.

20. The article of claim 19 wherein the group IV metal is Hf.

* * * * *